United States Patent [19]

de Rook

[11] 4,057,526

[45] Nov. 8, 1977

[54] PROCESS FOR PREPARING FROST RESISTANT CONCRETE

[75] Inventor: Poppe de Rook, Monnickendam, Netherlands

[73] Assignee: Akzo N.V., Arnhem, Netherlands

[21] Appl. No.: 683,958

[22] Filed: May 6, 1976

[30] Foreign Application Priority Data

May 12, 1975 Netherlands ................. 7505525

[51] Int. Cl.² .................................................. C04B 7/35
[52] U.S. Cl. ..................................... 260/29.6 S; 106/97; 260/42.13
[58] Field of Search ............... 106/90, 97; 260/29.6 S, 260/42.13

[56] References Cited

U.S. PATENT DOCUMENTS

| | | | |
|---|---|---|---|
| 2,819,171 | 1/1958 | Scripture et al. | 106/90 |
| 3,021,291 | 2/1962 | Thiessen | 106/90 |
| 3,272,765 | 9/1966 | Sefton | 106/90 |
| 3,351,478 | 11/1967 | Dodson et al. | 106/90 |
| 3,764,357 | 10/1973 | Bowles et al. | 106/90 |
| 3,869,295 | 3/1975 | Bowles et al. | 106/90 |
| 3,883,359 | 5/1975 | Harvey | 106/90 |

*Primary Examiner*—J. Poer
*Attorney, Agent, or Firm*—Stevens, Davis, Miller & Mosher

[57] ABSTRACT

A process is provided for making frost resistant cement products having improved 28 day compressive strengths wherein a gas is included in the product by substantially uniformly dispersing hollow gas filled synthetic polymeric spheres in the cement mixture prior to setting thereof. The invention also provides a frost resistant cement product having from about 0.01 to about 0.1% by weight based on the weight of cement of synthetic polymer spheres filled with air and having a diameter of from about 10 to about 100 $\mu$m substantially uniformly dispersed therein.

12 Claims, No Drawings

PROCESS FOR PREPARING FROST RESISTANT CONCRETE

This invention relates generally to a process for the preparation of a frost resistant concrete and, more particularly, to such a process wherein a certain volume percentage of gas in a finely divided form is incorporated in a fresh concrete mixture and the mixture is subsequently allowed to set and cure.

Such a process is generally known and described for instance by Lea et al in the *Chemistry of Cement and Concrete*, Edward Arnold Publ., London (1956), p. 513 ff.

During the preparation of a concrete mixture always some air will be entrapped in it. The amount thereof appears to be very much dependent on a great many process variables, such as the type of mixer, the mixing time and the plasticity of the mixture. Of great importance is also the way in which the poured mixture is compacted and the nature and the amount of the used admixtures.

In some cases where it is desirable that this air content be increased, as in the preparation of a frost resistant concrete, use is made sometimes of surface active agents. Generally, it will be aimed at the volume percentage of air entrapped in the concrete mixture being as small as possible because the compressive strength of the final concrete decreases with increased amounts of air.

So far it has been assumed that a sufficiently frost resistant concrete is obtained by incorporating in the concrete 3 to 6 percent by volume of air. This amount of air should be dispersed in the concrete mixture as finely as possible in the form of microscopically small gas bubbles.

It will be clear that during the many treatments to which the concrete mixture is subjected, part of these bubbles will escape from it. They also may form into larger air bubbles, which too is attended with a decrease in frost resistance. From the above it will be obvious that it is extremely difficult to disperse properly a predetermined volume percentage of air in a concrete mixture so that, on the one hand, a good frost resistance is guaranteed and, on the other hand, the compressive strength is not appreciably reduced.

It is an object of the present invention to provide a process which makes it possible very accurately and reliably to disperse a pre-determined amount of gas in fresh concrete wherein the changing of one or more of the above-mentioned process variables will not seriously affect the resulting concrete. Another object of the invention is to provide a process for making frost resistant concrete by dispersing a gas in the cement mix prior to settling which is less sensitive to variations in gas bubble size and gas percentages in the mix and which produces a concrete of improved compressive strength.

The foregoing objects and others are accomplished in accordance with this invention, generally speaking, by providing a process for making a frost resistant concrete wherein a gas entrapped in spheres of a synthetic polymer which is inert under the curing conditions is added to a concrete mix prior to setting, the diameter of the spheres being in the range of about 10 to 100 μm and the amount in which they are added in the range of 0.01 to 0.1% by weight calculated on the dry cement weight.

It should be added that the use of gas-filled spheres in concrete is known in itself from the German Patent Specification 1,181,397. In that case, however, they are used in the preparation of foamed or lightweight concrete. But the compressive strength of such concrete is generally much lower and does not meet with general requirements for concrete building structures. In the same patent specification, column 7, lines 15–28, attention is drawn to the fact that air entrapped in spheres incorporated in a concrete mixture will not form into large air bubbles during transport to the building site. This is in contrast to the situation in which, for the purpose of improving frost resistance, air is incorporated in a known way in the form of air bubbles in an amount of 3 to 6 percent by volume. Actually, in the German patent specification it is not suggested that the spheres described therein should be used for the purpose of improving frost resistance. This in itself is not quite so surprising if one considers that the use of an amount of about 3 percent by volume of air entrapped in spheres will not only unfavorably influence the cost price but also the processibility of the mortar. It is true that the latter effect may be eliminated by changing the water/cement ratio, but this will generally be detrimental to the compressive strength of the final concrete. In the process according to the invention spheres are added which contain air in an amount which has so far been considered insufficient to obtain satisfactory frost resistance.

According to the invention, for instance, a considerable increase in frost resistance is obtained even when use is made of only a very small amount of as little as 0.015% by weight (calculated on the dry cement weight) of spheres of say, "Saran" (a vinyl chloride-vinylidene copolymer) with an average particle size of 40 μm. Such an addition is found to correspond to a volume percentage of air of as little as 0.26%.

British Patent Specification 1,066,787 also describes the preparation of a lightweight concrete comprising the addition of expanded resinous particles having a predominantly closed cell structure. Both the dimensions of the expanded polystyrene particles (page 1, lines 41–43) and the amounts in which they are added (page 2, lines 40–47) appreciably differ from what has been proposed in the present application.

Adding resinous particles to a concrete mixture for the purpose of increasing the frost resistance of concrete is known from German Patent Specification 2,229,094. The resinous particles are of a hard polyurethane foam and measure < 0.2 mm. This material is added in an amount of 4 to 30 percent by volume, calculated on the concrete. The polyurethane foam has a substantially open structure and is capable of absorbing water in an amount of 3 to 4 times its weight. Although mention is made of a positive contribution to increasing the frost resistance as a result of the presence of particles having a closed cell structure, the presence of open pores is considered essential (page 3, line 25; page 4, line 7).

In order to achieve an acceptable compressive strength of concrete after 28 days the percentage of gas dispersed in a concrete mixture should be as low as possible. On the assumption that in order to obtain a good frost resistance the conventional air-entraining agent must be incorporated in a concrete mixture in an amount of 0.05% by weight, based on the dry cement, and the spheres according to the invention in an amount of only 0.02% by weight, the results mentioned in the following Table I show that when a conventional air-entraining agent is used, the loss of compressive strength is twice as high as in the case of using the spheres according to the invention.

The preparation of the spheres that may be used in the present process is described in, for instance, German Patent Specification 1,089,156 and U.S. Pat. Nos. 3,611,583 and 3,779,951.

Favorable results may be obtained with the use of spheres of polyethylene, polypropylene, polymethyl methacrylate, poly-o-chlorostyrene, polyvinyl chloride, polyvinylidene chloride, polyacrylonitrile, polystyrene, copolymers thereof or the like.

It is preferred that spheres be employed that are made of a copolymer of vinylidene chloride and acrylonitrile. Optimum results were obtained when use was made of spherse made of a copolymer of vinyl chloride and vinylidene chloride (Saran).

It has been found that an average sphere size of 10 to 60 $\mu$m leads to very favorable results. Optimum results were obtained with Saran spheres having an average particle size of about 40 $\mu$m. One kg. of microspheres of these dimensions was found to have a compressed bulk density of about $17.5 \times 10^{-3}$ kg/dm$^3$.

The microspheres can be incorporated in the concrete mixture in various ways. They may be added as dry powder, in the form of a non-dusting composition or in combination with other admixtures. Since the product in powdered form is difficult to handle, preference is given to the last mentioned two forms.

Table I

| Slump in cm | water/ cement factor | air content volume %*) | compressive strength after 28 days N/mm² | percentage compressive strength relative to control |
|---|---|---|---|---|
| Control | 12 | 0.50 | 1.2 | 41.5 | 100 |
| 0.05% by weight of conventional air-entraining agent | 12 | 0.45 | 6.2 | 34.0 | 82 |
| Control | 9 | 0.53 | 0.9 | 40.7 | 100 |
| 0.02% by weight of air filled Saran spheres | 10 | 0.53 | 1.5 | 37.5 | 92 |

*)measured in accordance with Din 1048 Blatt 1 (1972) (Pressure Method) measuring accuracy ± 0.4%

It has been found that for the composition to be readily introduced into the concrete mixture it should be made up of 8% by weight of air filled hollow Saran spheres, 13% by weight of sodium gluconate and 79% by weight of water. If the microspheres are used in the form of dry powder, use may with advantage be made of the process described in the U.S. Pat. No. 3,611,583. The dry microspheres thus obtained may be pre-mixed, if desired, with the dry, cooled cement. Since anhydrous microspheres cause dusting and other handling problems, it is preferred that the wet foam containing microspheres obtained after expansion should be concentrated and subsequently incorporated in a wet composition made up as indicated above.

The amount of spheres to be added to the concrete mixture also may vary between wide limits. The use of less than 0.01% by weight will generally result in insufficiently improved frost resistance.

Addition of more than 0.1% by weight of dry spheres does not just lead to extra improvement of frost resistance; it is attended with an increase in cost price, a decrease of compressive strength, and a deterioration of processing properties. The optimum amount of spheres to be added — resulting in both good frost resistance and minimum loss of compressive strength — will for most concrete compositions be about 0.015 - 0.035% by weight, based on the dry cement weight.

The 28 day compressive strength of the product containing spheres according to the present invention generally is at least 85% of the 28 day compressive strength of the same concrete without these spheres.

The invention will now be elucidated in the following examples, which are given by way of illustration only and not intended for purposes of limitation.

EXAMPLE I

This example illustrates the behavior of a number of test bars made from a fresh concrete mixture to which various air-entraining agents of Saran spheres had been added during a number of freezing-and-thawing cycles. The bars were tested in conformity with ASTM standard C 290. After a curing period of 14 days the test specimens were subjected to 40 cycles of freezing and thawing. The maximum and minimum temperatures used were $+10°$ and $-18°$ C., respectively. Both the thawing and the freezing periods each lasted 6 hours. At particular intervals the weight and the length of the test specimens were measured. After 40 cycles the appearance of the test specimens was evaluated visually. The test specimens respectively contained no air-entraining agent, a good air-entraining agent, a poor air-entraining agent and Saran in an amount of 0.1% by weight, calculated on the dry cement weight. Of each type three test specimens were made. The results of this test are listed in the following table:

Table II

| Admixture | % by weight based on the dry cement | flow limit in mm. | vol. % air | expansion/ cycle 0.01 mm. | state after 40 cycles |
|---|---|---|---|---|---|
| none | — | 192 | 2.5 | 3.5 | very poor |
| good air-entraining agent | 0.05 | 198 | 7.6 | 0 | good |
| bad air-entraining agent | 2 | 194 | 7.5 | 2.4 | poor |
| Saran | 0.1 | 188 | 4.9 | 0 | good |

The above table also shows that the test specimen without any admixture gradually expanded within the end resulting in crack formation. It should be added that of the 4.9% by volume of air given for the 0.1% by weight of Saran spheres only 1.7% by volume is supplied by the Saran spheres.

EXAMPLE II

Use was made of a number of mortar test specimens to which various percentages of Saran microspheres and a classical air-entraining agent had been added. The ingredients were mixed in a standard Hobart mixer. After determination of the plasticity and the air content, the fresh mortar was poured into standard mortar molds (40 mm × 40 mm × 160 mm). The fresh mortar was vibrated over 2 periods of 1 minute each. After 24 hours the mortar test specimens were released from the molds.

The plasticity of the fresh mortar was determined by subjecting the test specimens to the shock test in accordance with German Standard DIN 1164/58. The air content of the fresh mortar was determined by the pressure method. Compressive strength and bending tensile strength of the mortar test specimens were determined after 28 days in accordance with German Standard DIN 1164/7.

The frost-thaw resistance was measured in accordance with the American Standard ASTM C 290, and the Dutch CUR Report 64, Frost Thaw Resistance of Concrete. After a fortnight's hardening under standard conditions (100% rel. hum., 20° C.) the mortar test specimens were subjected to the freezing-thawing tests. The mortar test specimens were kept under water throughout the testing period. In the testing period (40 cycles), the temperature of this water was measured by means of a thermocouple. Extreme temperatures of a cycle:

Maximum temperature: +10° C.
Minimum temperature: −18° C.
Thawing period: 6 hours
Freezing period: 6 hours The freezing-thawing experiments were carried out continuously in an automatically controlled climatic chamber supplied by Weiss, Giessen, Germany. The expansion of the mortar test specimens was determined by means of a measuring instrument supplied by Tonindustrie, Germany (Bauform 6101). The mean expansion of the mortar test specimens per cycle is a measure of the frost-thaw resistance. The frost-thaw resistance was measured on the air-entrained mortar control test specimens and on specimens containing Saran microspheres. After forty freezing-thawing cycles, the compressive strength and the bending-tensile strength of the test specimens were determined and the values obtained compared with the mechanical properties of test specimens of the same age after curing under standard conditions (100% rel. hum., 20° C.). After the freezing-thawing tests the appearance of the test specimens was evaluated. The results of these tests are given in the following table:

The above table clearly shows that the volume percentage of air used in the process according to the invention may be kept considerably below the minimum proportion of 3 percent by volume used up till now without affecting frost resistance.

EXAMPLE III

The procedure of Example II was repeated, except that instead of a mortar a concrete mixture was used. From the results given in the following table it will be clear that the lower limit of the amount of Saran microspheres added is 0.01% by weight, based on the dry cement weight.

TABLE IV

| Run no. | | I | II | III | IV |
|---|---|---|---|---|---|
| % by weight of Saran microspheres, based on the dry cement weight | | — | 0.010 | 0.015 | 0.020 |
| Calculated spacing factor (theoretical) | mm | — | 0.23 | 0.20 | 0.18 |
| Slump | cm | 10.5 | 10 | 12 | 8 |
| Flow | cm | 48 | 49.5 | 46.2 | 46.5 |
| Air content | vol. % | 1.6 | 1.7 | 1.7 | 1.7 |
| Compressive strength after freezing-thawing tests (35 days) | N/mm$^2$ | 15.7 | 23.5 | 31.9 | 32.6 |
| Compressive strength (35 days) (20° C.) | N/mm$^2$ | 41.5 | 40.6 | 39.7 | 37.5 |
| Loss in compressive strength due to freezing-thawing tests | % | 62 | 42 | 20 | 13 |
| Bending-tensile strength after freezing-thawing tests (35 days) | N/mm$^2$ | 0.66 | 1.80 | 3.37 | 3.50 |
| Bending-tensile strength (35 days) (20° C.) | N/mm$^2$ | 4.73 | 4.82 | 4.41 | 4.10 |
| Loss in bending-tensile strength due to freezing-thawing tests | % | 86 | 63 | 24 | 15 |

Experiments Nos. III and IV show some differences between the data obtained at 20° C. and after the freezing-thawing cycles. They are to be attributed to the decreased rate of the curing reaction as a result of the lower temperatures used in the frost-thaw resistance tests.

EXAMPLE IV

The procedure of Example III was repeated, except that the frost resistance of concrete with various percentages of Saran was measured by determining the relative modulus of elasticity. This was done with the aid of the TNO-IBBC concrete tester. This instrument is designed to measure the speed of the longitudinal ultrasonic pulses through concrete, the measured speed being related to the modulus of elasticity of the material. The modulus of elasticity of the concrete test prisms decreases with crack formation due to freezing-thawing. The frost-thaw resistance of the concrete decreases with relative modulus of elasticity. The modulus of elasticity may be calculated from the formula:

Table III

| Run no. | | 1 | 2 | 3 | 4 | 5 | 6 | 7 |
|---|---|---|---|---|---|---|---|---|
| % by weight of additive based on the dry cement weight | | — | 0.1 S** | 0.08 S | 0.02 S | 0.005 S | 0.2 C** | 0.04 C |
| Plasticity | mm | 177 | 179 | 180 | 170 | 168 | 173 | 167 |
| Air content | vol.% | 4.6 | 3.9 | 4.2 | 1.7 | 2.1 | 5.8 | 3.3 |
| Bending-tensile strength (28 days) | N/mm$^2$ | 6.55 | 5.85 | 5.32 | 5.80 | 5.97 | 5.66 | 6.15 |
| Compressive strength (28 days) | N/mm | 36.0 | 29.2 | 28.8 | 30.5 | 37.5 | 31.3 | 30.3 |
| Bending-tensile strength after freezing-thawing tests*** | N/mm$^2$ | 0 | 5.17 | 5.51 | 4.21 | 0 | 4.31 | 5.41 |
| Compressive strength after freezing-thawing tests*** | N/mm$^2$ | 0 | 28.4 | 35.2 | 28.5 | 0 | 32.7 | 30.7 |
| Bending-tensile strength (35 days) | N/mm$^2$ | 6.75 | 5.68 | 6.07 | 5.34 | 6.42 | 5.50 | 6.60 |
| Compressive strength (35 days) | N/mm$^2$ | 41.1 | 30.5 | 32.0 | 32.3 | 37.2 | 31.7 | 41.1 |
| Loss in bending-tensile strength due to freezing-thawing tests | % | 100 | 10 | 10 | 20 | 100 | 20 | 20 |
| Loss in compressive strength due to freezing-thawing tests | % | 100 | 10 | 0 | 10 | 100 | 0 | 30 |
| Expansion/freezing-thawing cycle | 0.01 mm | 5.5 | 0 | 0 | 0.1 | 5.5 | 0.1 | 0 |
| Calculated Spacing-factor (theoretical) | mm | — | 0.09 | 0.10 | 0.18 | 0.30 | — | — |
| Condition test specimen after freezing-thawing tests | | very poor | good | good | good | very poor | good | good |

**S = Saran microspheres C = Classical air entraining agent.
***These values were compared with the strength values after 35 days.

$$E_{dyn} = v^2 \cdot n \frac{(1 + u)(1 - 2u)}{1 - u}$$

where
- $v$ = the velocity of propagation in m/sec.,
- $n$ = the density in kg/m$^3$
- $u$ = the Poisson's ratio (approx. 0.15 for strong, and 0.30 for weak concrete).

The velocity of propagation is measured across the concrete. From the above formula it follows that with $u$ and $n$ remaining the same for a given concrete, the change in modulus of elasticity is directly proportional to the change in velocity of propagation. The results of the measurements are summarized in the following table:

TABLE V

| Run No. | I | II | III | IV |
|---|---|---|---|---|
| % by weight of Saran spheres, based on the dry cement weight | — | 0.010 | 0.015 | 0.020 |
| Calc. spacing factor (mm) | — | 0.23 | 0.20 | 0.18 |
| Number of cycles | \multicolumn{4}{c}{Relative modulus of elasticity (%)} | | | |
|  | I | II | III | IV |
| 0 | 100 | 100 | 100 | 100 |
| 6 | 90 | 97 | 99 | 99 |
| 14 | 86 | 97 | 99 | 98 |
| 20 | 81 | 97 | 99 | 99 |
| 28 | 72 | 93 | 98 | 98 |
| 34 | 64 | 89 | 98 | 98 |
| 42 | 56 | 82 | 99 | 98 |

The above table clearly shows that there is very little, if any, sign of deterioration when, in the fresh concrete, there was incorporated 0.01% by weight of Saran spheres, based on the dry cement weight.

Although the invention has been described in detail for the purpose of illustration, it is to be understood that such detail is solely for that purpose and that variations can be made therein by those skilled in the art without departing from the spirit and scope of the invention except as it may be limited by the claims.

I claim:

1. In a process for the preparation of a frost resistant concrete, in which process a volume percentage of gas in a finely divided form is incorporated in a fresh concrete mixture which is subsequently allowed to cure, the improvement which comprises adding the gas to the mixture while it is entrapped in spheres of a synthetic polymer which is inert under the curing conditions, the dimensions of the spheres being in the range of about 10 to 100 μm and the amount in which they are added in the range of 0.01 to 0.1% by weight, calculated on the dry cement weight.

2. The process of claim 1 wherein the spheres are polyethylene, polypropylene, polymethyl methacrylate, poly-o-chlorostyrene, polyvinyl chloride, polyvinylidene chloride, polyacrylonitrile, polystyrene or copolymers thereof.

3. The process of claim 1 wherein the spheres are a copolymer of vinylidene chloride and acrylonitrile.

4. The process of claim 1 wherein the spheres are a copolymer of vinyl chloride and vinylidene chloride.

5. The process of claim 1 wherein the spheres have an average particle size within the range of from 10 to 60 μm.

6. The process of claim 5 wherein the average particle size of the spheres is about 40 μm.

7. The process of claim 1 wherein the spheres are incorporated in the concrete mixture in an amount of about 0.015 to 0.035% by weight, calculated on the dry cement weight.

8. The process of claim 1 wherein the spheres are incorporated in the concrete mixture while it is in the form of a wet composition.

9. The process of claim 8 wherein the wet composition contains about 8% by weight of spheres, 13% by weight of sodium gluconate and 79% by weight of water.

10. Concrete structures made of a concrete prepared by a process according to claim 1.

11. A frost resistant cement based product having from about 0.01 to about 0.1% by weight based on the weight of cement of synthetic polymer spheres filled with air and having a diameter of from about 10 to about 100 μm substantially uniformly dispersed therein.

12. A process for improving the frost resistance of a cement based product which comprises mixing with a cement mix prior to setting from about 0.01% to about 0.1% by weight calculated on the weight of dry cement of spheres of a synthetic polymer containing an inert gas, said spheres having a cross-section of from about 10 to about 100 μm and being inert to the cement product.

* * * * *